(12) United States Patent
Schneider et al.

(10) Patent No.: US 7,400,751 B2
(45) Date of Patent: Jul. 15, 2008

(54) IMAGING DEVICE AND METHOD HAVING A PIVOTABLE TRANSDUCER

(75) Inventors: John K. Schneider, Snyder, NY (US);
Jack C. Kitchens, Buffalo, NY (US);
Stephen M. Gojevic, Buffalo, NY (US)

(73) Assignee: Ultra-Scan Corporation, Amherst, NY (US)

( * ) Notice: Subject to any disclaimer, the term of this patent is extended or adjusted under 35 U.S.C. 154(b) by 342 days.

(21) Appl. No.: 10/982,614

(22) Filed: Nov. 5, 2004

(65) Prior Publication Data

US 2005/0117786 A1    Jun. 2, 2005

Related U.S. Application Data

(60) Provisional application No. 60/517,808, filed on Nov. 6, 2003.

(51) Int. Cl.
*G06K 9/00* (2006.01)

(52) U.S. Cl. .................. 382/124; 382/125; 382/126

(58) Field of Classification Search .............. 382/115, 382/124–127; 600/437, 445
See application file for complete search history.

(56) References Cited

U.S. PATENT DOCUMENTS

| | | | |
|---|---|---|---|
| 5,224,174 A * | 6/1993 | Schneider et al. ........... 382/124 |
| 5,229,764 A | 7/1993 | Matchett et al. | |
| 5,448,649 A * | 9/1995 | Chen et al. .................. 382/126 |
| 5,546,471 A | 8/1996 | Merjanian | |
| 5,613,012 A | 3/1997 | Hoffman et al. | |
| 5,832,464 A | 11/1998 | Houvener et al. | |
| 6,028,950 A | 2/2000 | Merjanian | |
| 6,491,637 B2 * | 12/2002 | Foster et al. ................ 600/452 |
| 2005/0144133 A1 | 6/2005 | Hoffman et al. | |
| 2005/0283063 A1 * | 12/2005 | Besson et al. ............... 600/407 |

* cited by examiner

*Primary Examiner*—Bhavesh M. Mehta
*Assistant Examiner*—John B Strege
(74) *Attorney, Agent, or Firm*—Hodgson Russ LLP (57) ABSTRACT

A finger imaging system having a linear actuator, a pivot arm mounted to the linear actuator and an energy transducer mounted to the pivot arm is disclosed. The system may include an arcuate platen positioned to receive energy from the transducer. A finger may be placed on the platen, and the position of the transducer may be fixed at a first position relative to the length of the finger. The pivot arm may be moved in order to move the transducer along an arcuate path while maintaining the transducer at the first position relative to the length. As the transducer moves along the arcuate path, energy may be emitted from the transducer and reflected from the finger. The reflected energy may be detected and data corresponding to the amount of time between sending and receiving energy may be stored as data along with the linear and angular position of the transducer. After data is gathered about the finger at the first position, the transducer may be moved to a second position relative to the length of the finger, where the process of sweeping the transducer along an arcuate path and gathering data may occur again. The stored data can be used to create an image of the fingerprint.

16 Claims, 12 Drawing Sheets

IMAGING DEVICE AND METHOD HAVING A PIVOTABLE TRANSDUCER

CROSS-REFERENCE TO RELATED APPLICATION

This application claims the benefit of priority to U.S. provisional patent application Ser. No. 60/517,808, filed on Nov. 6, 2003.

FIELD OF THE INVENTION

The present invention relates to systems and methods of obtaining information about a hand, such as a fingerprint.

BACKGROUND OF THE INVENTION

Conventional techniques for obtaining an image of a fingerprint apply ink to a finger and then gently roll the inked finger on a piece of paper. The fingerprint image that appears on the paper is a planar representation of a non-planar object. Images produced by such conventional techniques often distort the true finger print, because the rolling process is difficult to execute, and because skin and sub-dermal fat has a tendency to bunch up on the trailing edge of the fingerprint.

More recently, systems for obtaining fingerprint images electronically have been made available. In some such systems, the image is constructed by means of optical scanning. In such optical scanning systems, the finger is placed on a platen and a image is captured. The edges of the finger not in flat contact with the imaging surface platen are reconstructed by progressively stretching the image of the vertical surfaces to extend their projected image out to simulate a rolled impression scanning system. Such stretching and extending of the images introduces in accuracies.

Embodiments of the invention described herein may obtain an image without using paper and ink and without stretching or extending electronic images. In embodiments of the invention, an energy transducer is moved around a portion of a hand, such as a finger, to collect information about the finger that can be used to generate an image without distortion, parallax effects or the use of any image stretching techniques.

SUMMARY OF THE INVENTION

The invention may relate to a system and a method of obtaining information about a hand, such as a fingerprint or palmprint. Such information may include skin surface ridge detail from a finger or palm. The information about the hand might need to be obtained even though the hand is dry, oily, dirty. Further, the information about the hand might need to be obtained from skin that has fine ridges, worn ridges, or from contaminated friction skin, such as skin that has embedded dirt, ink, paint, oil, grease or grime, that will interfere with the creation of a good fingerprint image. The information about the hand might need to be obtained although prior users left on the platen contaminants, such as previous fingerprints and skin surface oils.

The present invention may include a finger imaging system having a linear actuator, a pivot arm mounted to the linear actuator and an energy transducer mounted to the pivot arm. The energy transducer may be an ultrasonic energy transducer or an electromagnetic energy transducer. The system may include an arcuate platen positioned to receive energy from the transducer. A finger may be placed on the platen, and the position of the transducer may be fixed at a first position relative to the length of the finger. The pivot arm may be moved in order to move the transducer along an arcuate path while maintaining the transducer at the first position relative to the length. As the transducer moves along the arcuate path, energy may be emitted from the transducer and reflected from the finger. The reflected energy may be detected and data corresponding to the amount of time between sending and receiving energy may be stored as data along with the linear and angular position of the transducer. After data is gathered about the finger at the first position, the transducer may be moved to a second position relative to the length of the finger, where the process of sweeping the transducer along an arcuate path and gathering data may occur again. The stored data can be used to create an image of the fingerprint.

An electronics system may be provided to control, coordinate and synchronize the transducer motion and data collection, and forward the data to a computer which is programmed to store the data or display an image. The computer may also be programmed to compare the data to data stored in a database in order to determine whether a match exists.

BRIEF DESCRIPTION OF THE DRAWINGS

For a fuller understanding of the nature and objects of the invention, reference should be made to the accompanying drawings and the subsequent description. Briefly, the drawings are.

FURTHER DESCRIPTION OF THE INVENTION

An embodiment of a system 1 according to the invention may be designed to obtain and record a fingerprint. In such an embodiment, there may be a platen 2, a linear actuator 3 and an angular actuator 4. The actuators 3, 4 may keep an energy transducer 5 aligned with the platen 2 and move the transducer 5 relative to the platen 2. The transducer 5 may be an ultrasonic energy transducer or an electromagnetic energy transducer.

Alignment of the transducer 5 may be accomplished so that for a particular angular position, the transducer 5 is the same distance from the platen 2 no matter where the linear actuator 3 places the transducer 5.

Alignment of the transducer 5 may be accomplished so that for a particular linear position, the transducer 5 is the same distance from the platen 2 no matter where the angular actuator 3 places the transducer 5. In one embodiment of the invention, the transducer 5 remains aimed at the surface of the platen 2 on which a finger rests so that the transducer 5 is substantially perpendicular to the surface of the platen 2, and is the same distance from the surface of the platen 2 for any angular position of the transducer 5.

The angular actuator 4 may include a pivot arm 8, to which the transducer 5 is mounted, and a limited angular sweep rotary solenoid 9. By providing a voltage to the rotary solenoid 9, the pivot arm 8 may be caused to move, and thereby cause the transducer 5 to move along an arcuate path. So that the angular position of the transducer 5 may be determined and stored as data, a rotary optical encoder 6 and code wheel 14 may be connected to the rotary solenoid 9.

The linear actuator 3 may include a stepper motor 7 that moves a carriage 13. The rotary solenoid 9 may be mounted to the carriage 13. Alignment between the transducer 5, the motor carriage 13 and the platen 2 may be accomplished by means of one or more linear slides 10.

The platen 2 may be arcuately shaped and formed from a material that will allow energy from the transducer 5 to pass through the platen 2. For example, the platen 2 may be formed from cross-linked polystyrene or polycarbonate when the transducer 5 is an ultrasonic transducer. The platen 2 may be shaped to form a cylindrical trough in which a finger may be placed. The axis 31 of the cylindrical trough may coincide with the axis about which the pivot arm 8 pivots. Further, the axis 31 of the cylindrical trough may be parallel to the linear motion accomplished by the actuator 3.

Figure 1A:
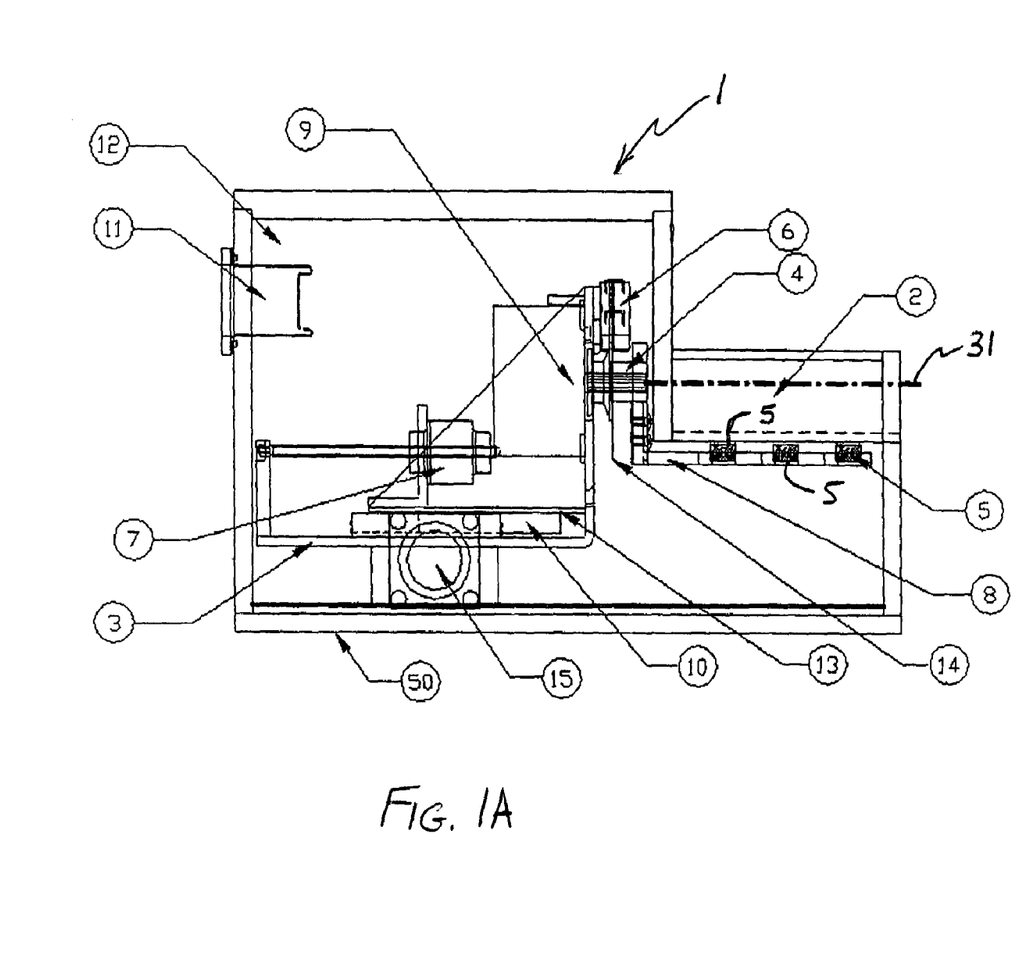
FIG. 1A, which is a side view of an embodiment of a fingerprint scanning mechanism according to the invention.
Figure 1B:
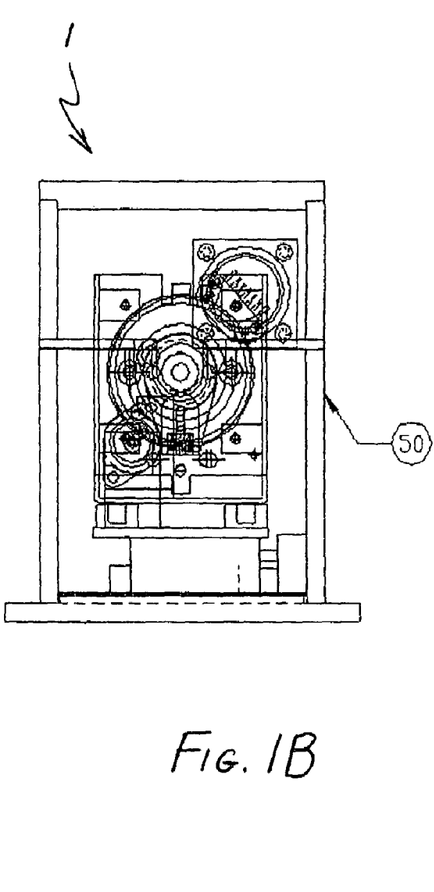
FIG. 1B, which is a front view of the embodiment depicted in FIG. 1A.
Figure 1C:
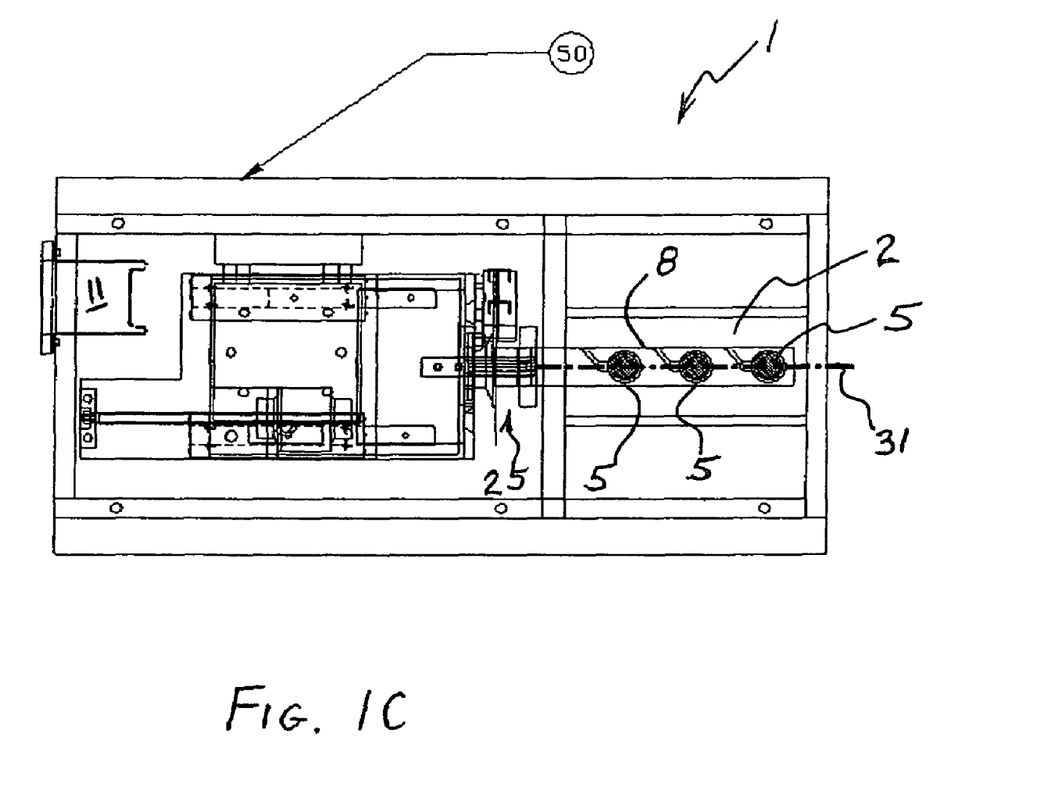
FIG. 1C, which is a top view of the embodiment depicted in FIG. 1A.

The fingerprint scanning system 1 depicted in FIGS. 1A, 1B and 1C may work by oscillating the pivot arm 8 about the axis 31 of the platen 2 while linearly moving the pivot arm 8 in incremental steps and collecting data used to produce the fingerprint image. Each piece of data may include the time for energy to travel to a finger on the platen and back to the transducer 5, as well as the corresponding angular and linear position of the transducer. Devices for detecting and recording an angular and linear position of a device are known in the art, and therefore are not described in detail herein.

The internal components of the fingerprint scanning system 1 may be immersed in a liquid ultrasound transmission media 12. A housing 50 may be provided to contain the transmission media. An example of such a transmission media is mineral oil. To allow for expansion and contraction of the liquid ultrasound transmission media 12, the housing 50 may be fitted with an elastomeric bellows 11 to compensate for the mismatch in coefficients of thermal expansion between the housing 50, housed components and ultrasound transmission media 12. In another embodiment of the invention, a small porous container or paper pouch filled with pellets of molecular sieve may be attached to a convenient place within the housing 50. Over time, the molecular sieve may scavenge air and gases that may enter the system through small leaks that might develop or by means of permeation through the elastomer comprising the expansion bellows 11.

The transducers 5 of FIGS. 1A, 1B and 1C may be aligned with the surface of the platen 2. While scanning, the pivot arm 8 may travel along an arcuate path parallel to and at a fixed distance from the platen 2. To accomplish this alignment, the linear actuator 3 may be capable of side-to-side adjustment, for example via vernier adjustment slide 15, and via vertical adjustment, for example using shims inserted between the vernier adjustment slide 15 and the linear actuator 3. These two adjustments may allow the transducers 5 to be concentrically moved by the angular actuator 4 relative to the platen 2. Pitch and yaw alignment of the linear actuator 3 with respect to the platen 2 may be accomplished with a precision assembly alignment fixture and pieces of shim stock.

Figure 2A:
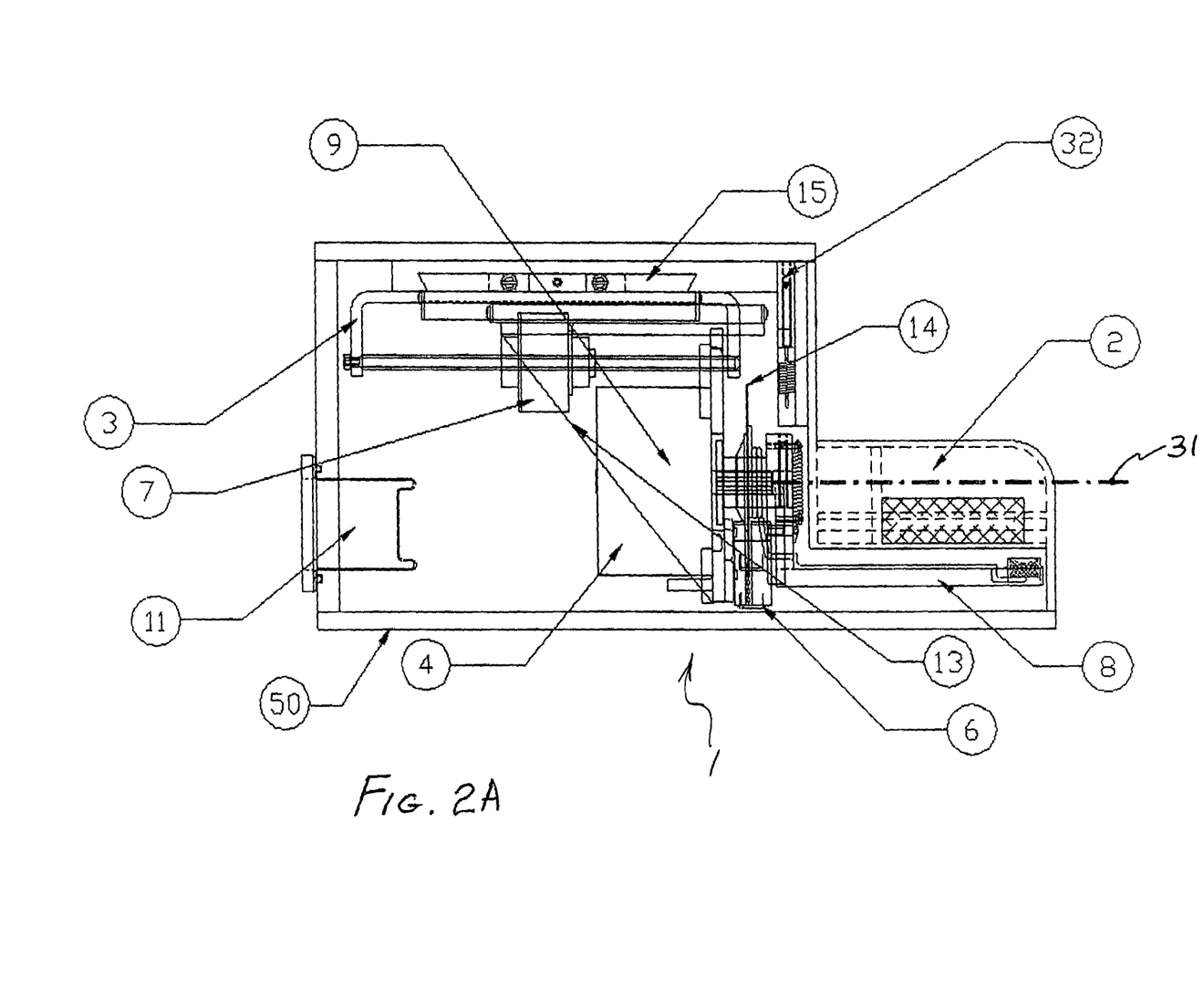
FIG. 2A, which is a side view of an embodiment of a fingerprint scanning mechanism according to the invention which differs from the embodiment shown in FIGS. 1A, 1B and 1C in that the embodiment of FIG. 2A includes an adjustment stage mechanism that allows for focusing and alignment of the transducer relative to the platen surface by adjusting the distance between the transducer to the platen.
Figure 2B:
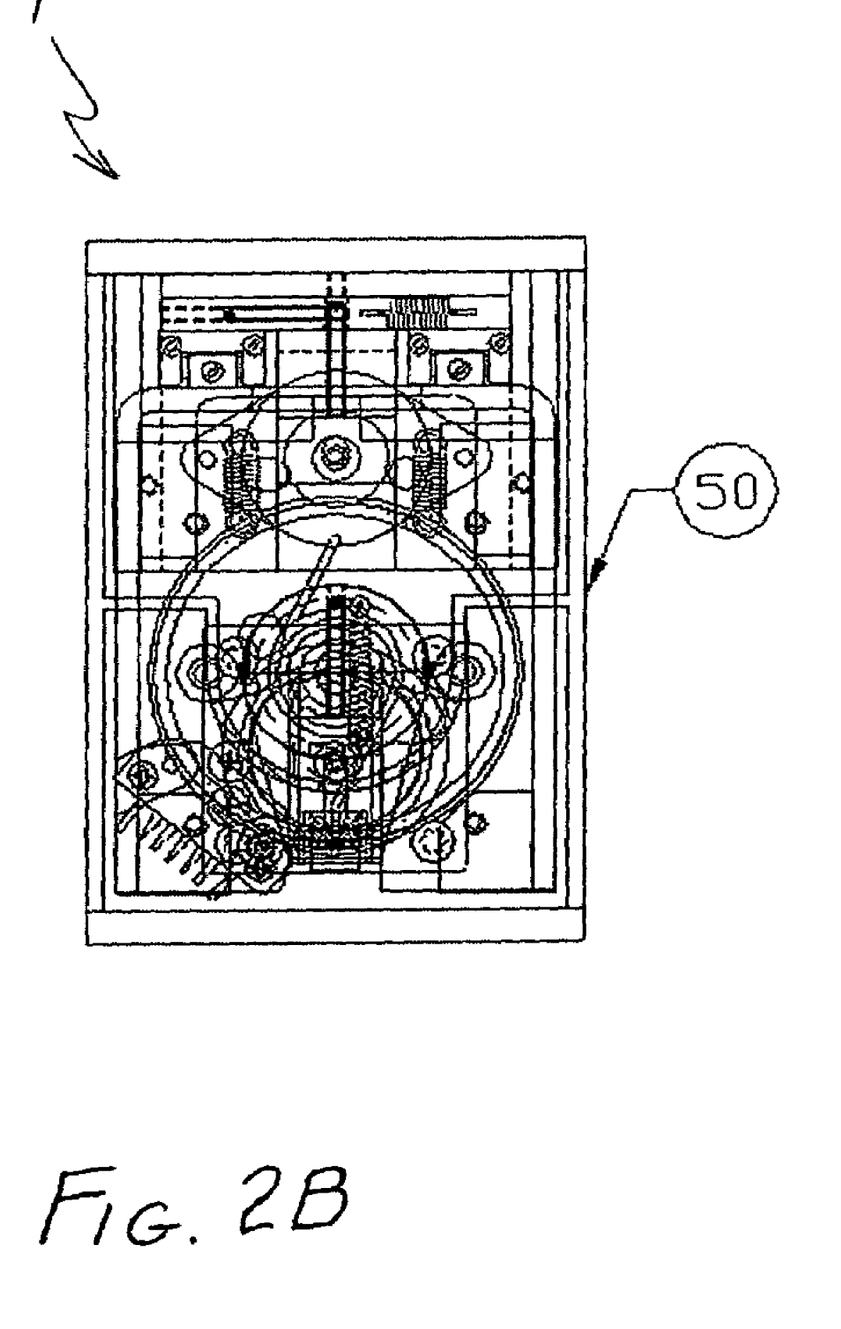
FIG. 2B, which is a front view of the embodiment depicted in FIG. 2A.
Figure 2C:
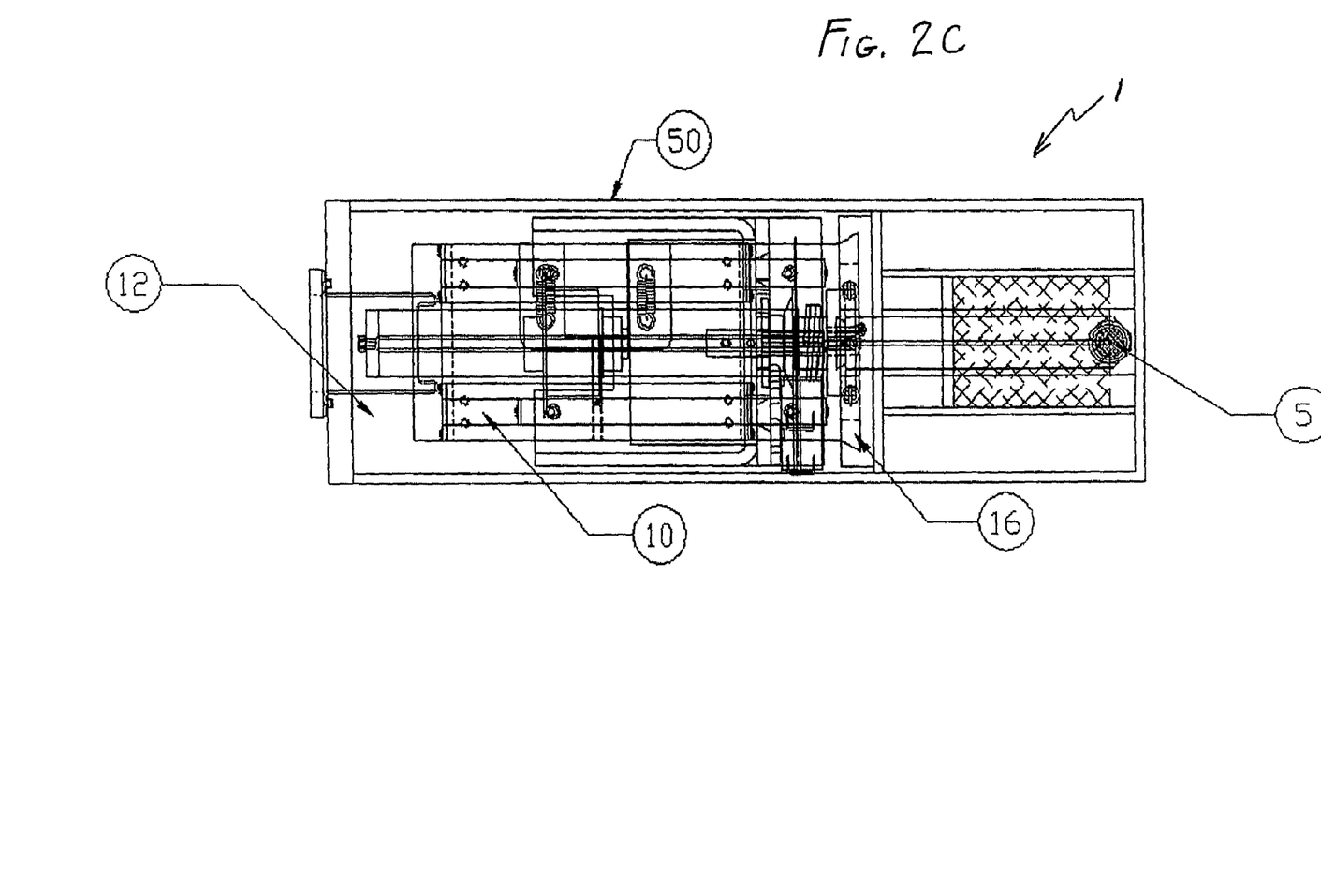
FIG. 2C, which is a top view of the embodiment depicted in FIG. 2A.
Figures 3A, 3B, 3C:
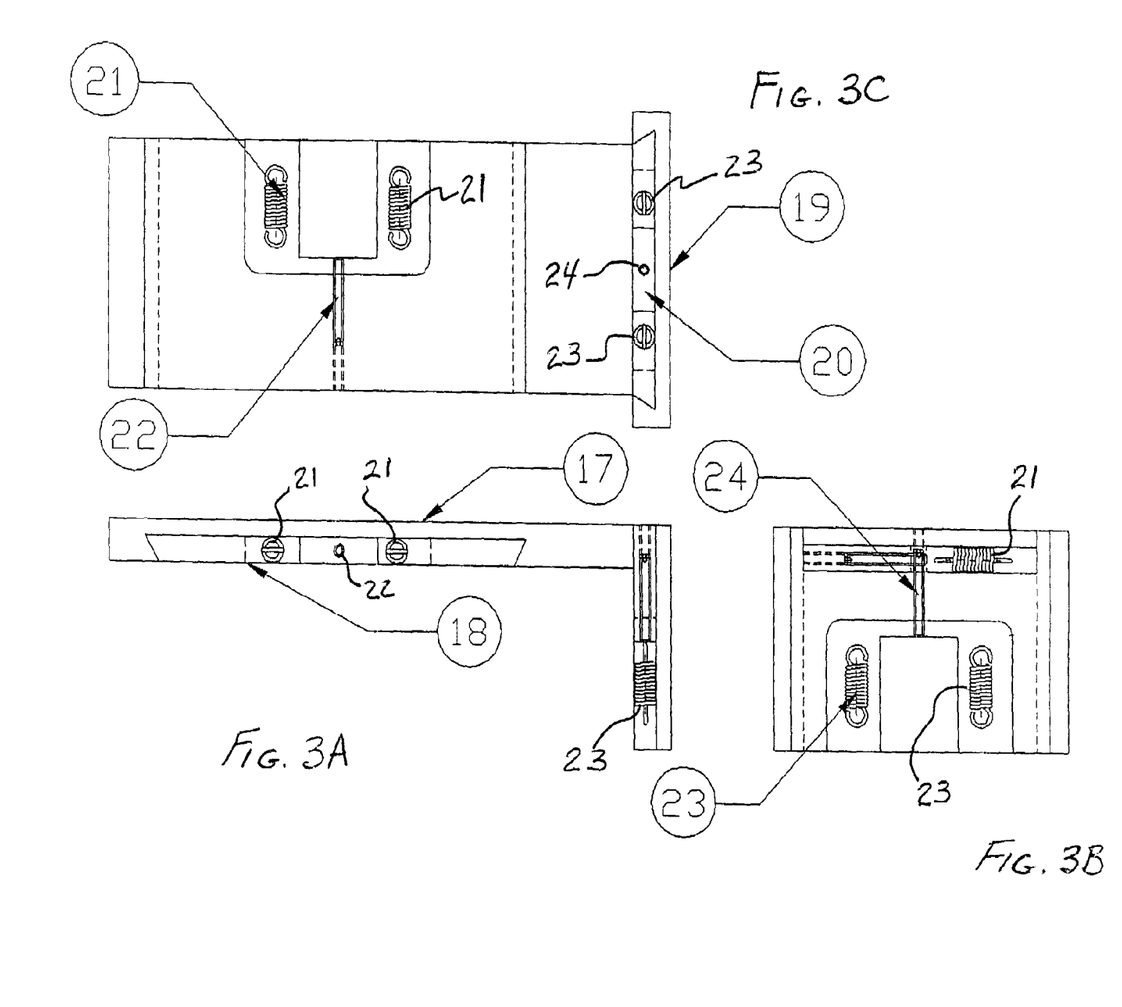
FIGS. 3A, 3B and 3C, which are side, front and top views respectively of an embodiment of an adjustment stage assembly having two degrees of freedom, and that may be used in the embodiment depicted in FIGS. 2A, 2B and 2C.

FIGS. 2A, 2B and 2C depict an alternate embodiment of an ultrasound fingerprint scanning mechanism according to the invention. This embodiment differs from the embodiment of FIGS. 1A, 1B and 1C in that it employs a two axis adjustment stage 32 to achieve vertical and side-to-side alignment, instead of relying on mechanical shims or spacers to align the linear actuator 3. FIGS. 3A, 3B and 3C depict the two axis adjustment stage 32.

Calibration with respect to the platen 2 may be needed. Since no two cylindrical surfaces have precisely the same radius of curvature, in order to perform a precision measurement of a finger in contact with the platen 2, the radius of curvature of the platen 2 may need to be known. A calibration process may provide this measurement. Since human fingers come in many sizes, a system according to the invention may be used with a plurality of platens 2, each platen 2 being a different size. The platen 2 may be mounted to the housing 50. Each platen 2 may be removable from the housing 50 in order to allow platens 2 of different sizes to be used with one housing 50. Since the same optical encoder 6 may be used with different sized fingers, and since the energy transducer 5 may be triggered to emit energy by a pulse from the encoder 6, the system 1 may be configured to collect the same number of data points, no matter what size the platen is. The encoder 6 and code wheel 14 may be selected and optimized for the largest size platen 2, and in that case, more data may be collected for smaller platens 2 than for larger platens 2. To achieve a standard resolution regardless of the platen size, data for smaller platens 2 may be interpolated or averaged by a computer, and the extraneous data discarded.

FIGS. 3A, 3B and 3C depict a two axis adjustment stage 32 employed for the vertical and side-to-side adjustments needed to align the transducers 5. In this assembly, vertical alignment of the angular actuator 4 may be accomplished by means of a linear slide assembly, having a fixed element 19 and a sliding element 20. Springs 23 may provide tension between fixed element 19 and sliding element 20. A finely threaded adjuster screw 24 may allow precise vertical positioning. Horizontal alignment of the angular actuator 4 may be accomplished by another linear slide assembly having a fixed element 17 and a sliding element 18. The fixed element 17 may be attached to the sliding element 20. Springs 21 may provide tension between the fixed element 17 and the sliding element 18, and another finely threaded adjuster screw 22 may allow for precise adjustment in the horizontal direction.

Figure 4A:
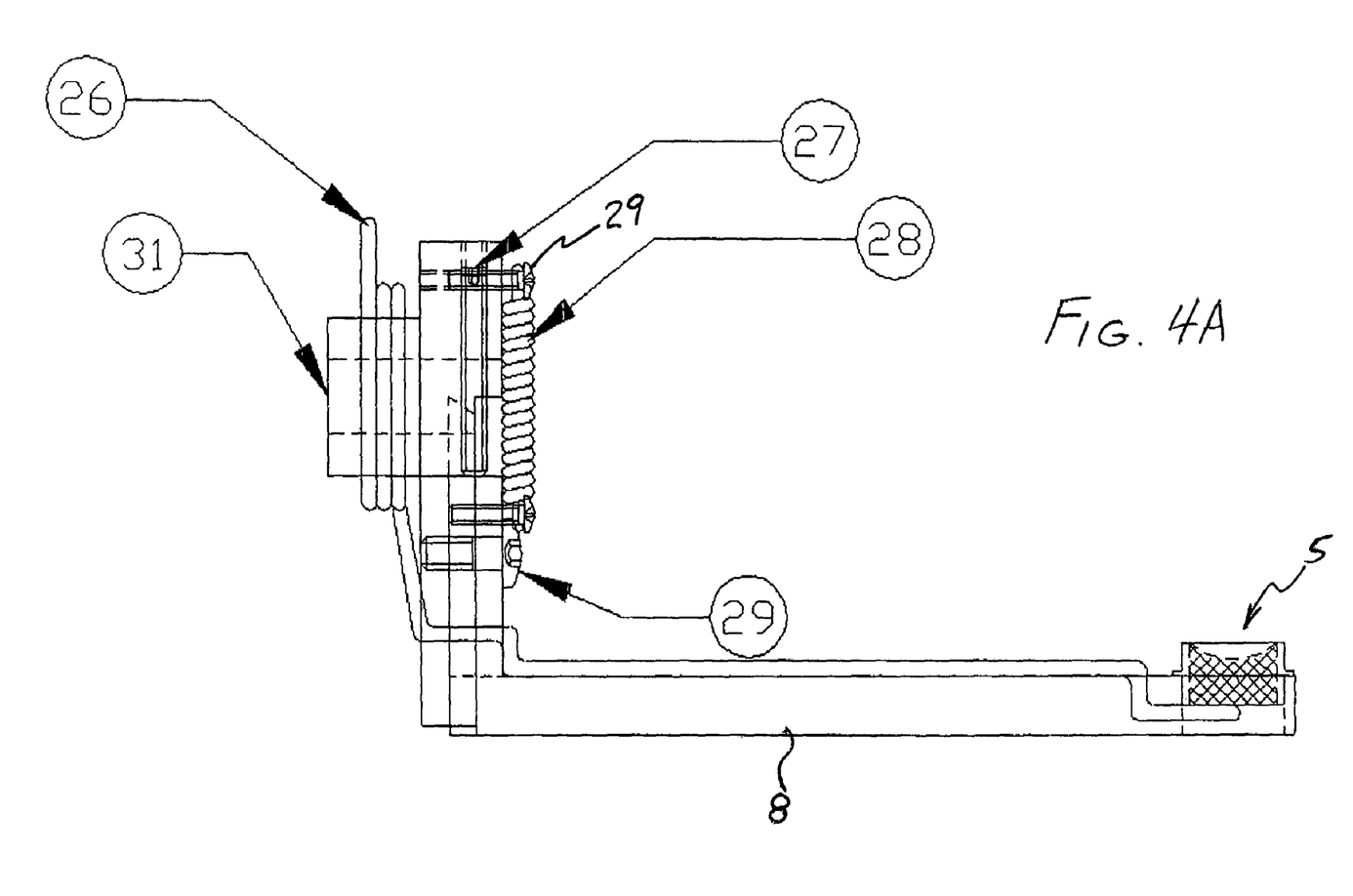
FIG. 4A, which is a side view of a transducer/pivot arm assembly having a mechanism for adjusting the distance between the transducer and the platen.
Figure 4B:
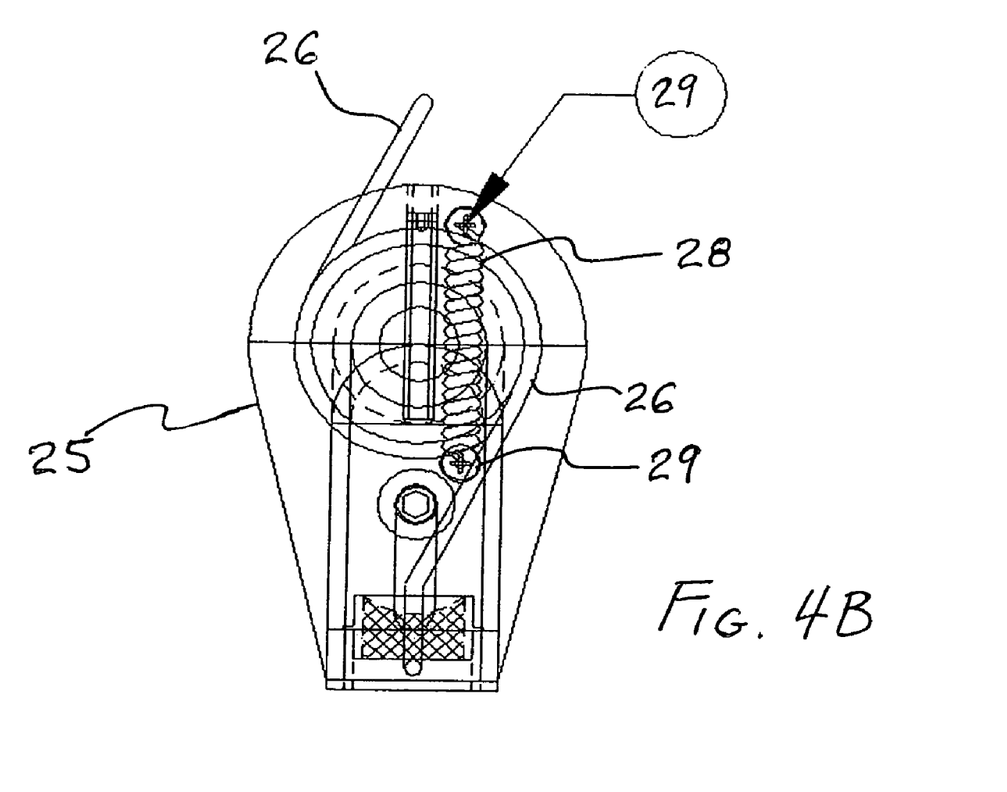
FIG. 4B, which is a front view of the assembly depicted in FIG. 4A.
Figure 4C:
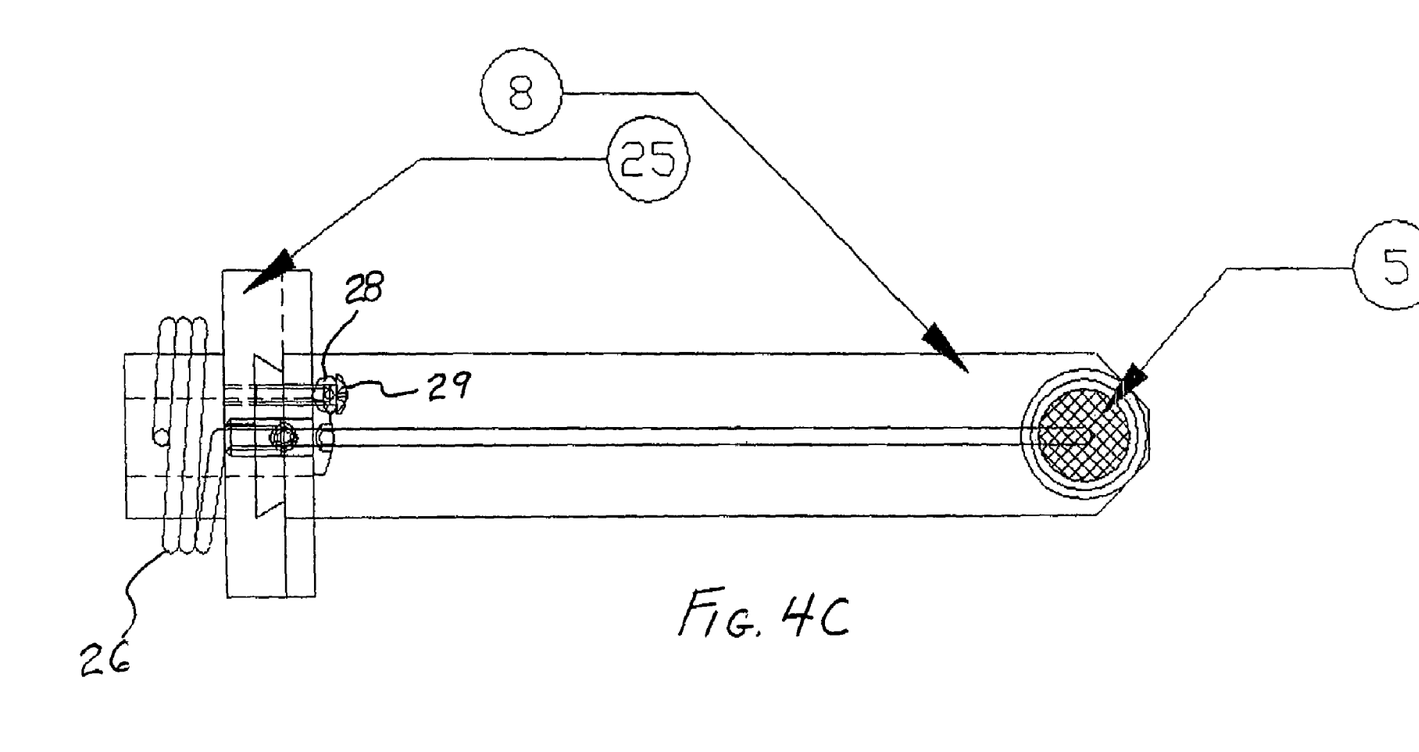
FIG. 4C, which is a top view of the assembly depicted in FIG. 4A.

In the embodiments depicted in FIGS. 1A, 1B, 1C and FIGS. 2A, 2B, 2C, the distance between the transducer 5 and the surface of the platen 2 may need to be adjusted in order to accommodate minor differences resulting from manufacturing the parts. Such adjustments may allow focusing of the transducer 5 for optimum response in imaging the object that is placed on the platen 2. FIGS. 4A, 4B and 4C depict an assembly for accomplishing such focusing. In FIGS. 4A, 4B and 4C there is shown a hub 25 and the pivot arm 8. The pivot arm 8 and hub 25 may be tongue-and-groove mated to allow a sliding interface. By providing such a sliding interface, the distance between the transducer 5 and the platen 2 may be adjusted. Attached to the pivot arm 8 may be the ultrasound transducer 5, and a locking screws 29 may be used to fix the position of the pivot arm 8 relative to the hub 25. A spring 28 and an adjustment screw 27 may be provided to allow small adjustments to the distance between the pivot arm 8 and the platen 2. By turning the adjustment screw 27, the pivot arm 8 is moved either by the adjustment screw 27 or the spring 28, depending on whether the pivot arm 8 is moved further or closer to the platen 2.

A coaxial cable 26 may bring electrical signals to and from the transducer 5. The coaxial cable 26 may be strain relieved to make the cable 26 resistant to fatigue failure in order to extend the life of the cable 26. Further, the coaxial cable 26 may be looped around the hub 25 several times before going to signal conditioning electronics, and in this manner, the cable 26 may act as a constant force coiled spring, winding and unwinding as the pivot arm 8 moves along an arcuate path, thereby reducing cyclic stress and extending the life of the cable 26.

Figure 5:
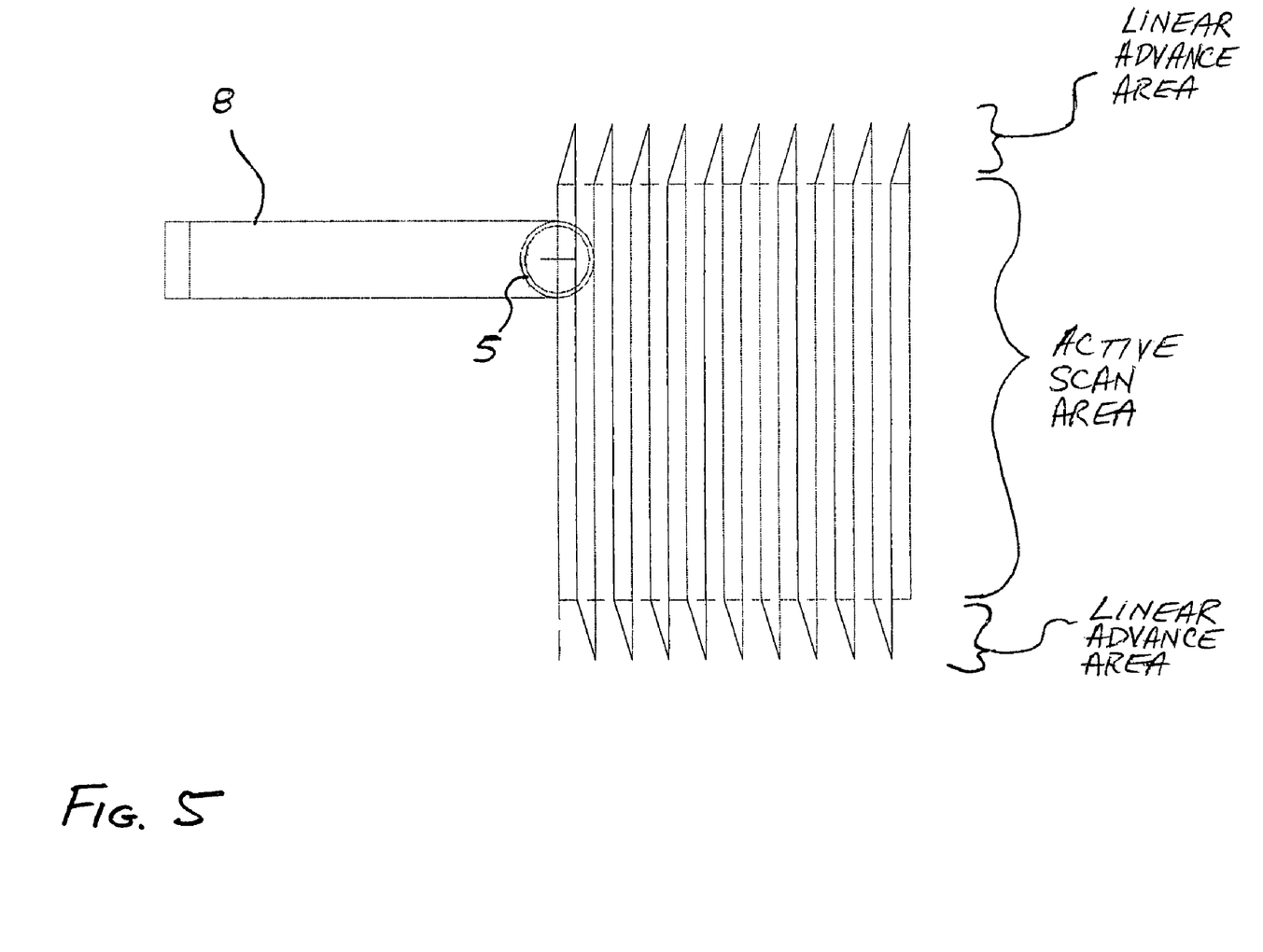
FIG. 5, which depicts scanning motion that a pivot arm and transducer might make during a scanning operation.

When the transducer 5 scans the platen 2 for the presence of a finger, a microprocessor may synchronize the interaction of the linear actuator 3, the angular actuator 4 and transducer 5. FIG. 5 will be used to provide a description of how fingerprint data may be obtained. A microprocessor may receive information about the angular position of the pivot arm 8 from the code wheel 14 and the optical encoder 6. If the pivot arm 8 is in an angular position used to reverse the direction in which the pivot arm 8 is moving, the linear control system 3 may advance the carriage 13, and signals from the transducer 5 may be ignored. The carriage 13 may be moved a distance equal to the scanning resolution. For example, if the scanning resolution is 500 lines per inch, the carriage 13 may be moved by the linear actuator 3 by 0.002 inches while the pivot arm 8 reverses its pivoting direction. In this manner, data may be gathered about the finger along scan lines which are parallel to each other.

As the pivot arm 8 returns through the active scanning sector of its arcuate path, the microprocessor may trigger the transducer 5 to send an energy pulse such as an ultrasonic pulse. The transducer 5 then detects the energy reflected from the finger and the microprocessor may then calculate the time that lapsed between sending the energy pulse and receiving the reflected energy. Each send and receive pulse may be triggered by a signal from the optical encoder 6 so that information is gathered at desired locations along the arcuate path traveled by the transducer 5. The code wheel 14 may be constructed such that the distance between code marks is equal to or smaller than the desired resolution. In this manner, the carriage 13 moves linearly, stops, the pivot arm 8 pivots while the transducer 5 gathers information, and then the carriage 13 moves linearly and stops before the pivot arm 8 pivots in the other direction, collecting information as the transducer moves along an arcuate path in the opposite direction. This process may be repeated until the desired number of scan-line sweeps have been completed. After the linear actuator 3 has moved a desired distance and information about the finger has been collected during a desired number of pivots, the rotary solenoid 9 may be turned off, and the linear actuator 3 may return the carriage 13 back to a starting position in order that the system 1 is ready to begin scanning another finger.

To initiate the scanning process, a contact switch may be pressed by the operator or a proximity detector may detect that a finger is on the platen 2. Another way to initiate a scanning process is to periodically provide an energy pulse from the transducer 5 and determine whether a finger is on the platen 5 by whether a reflected energy pulse is detected.

The invention has been described in a manner that provides for the use of cylindrical platens 2 having different radii. Since a calibration process is performed, perhaps during an initial setup of the system 1, the scanned image may be presented as scanned. Alternatively, post-processing may be performed on the image to size the image to the calibration requirements of a platen 5 having a different radius than the platen 5 used for calibration.

Figure 6:
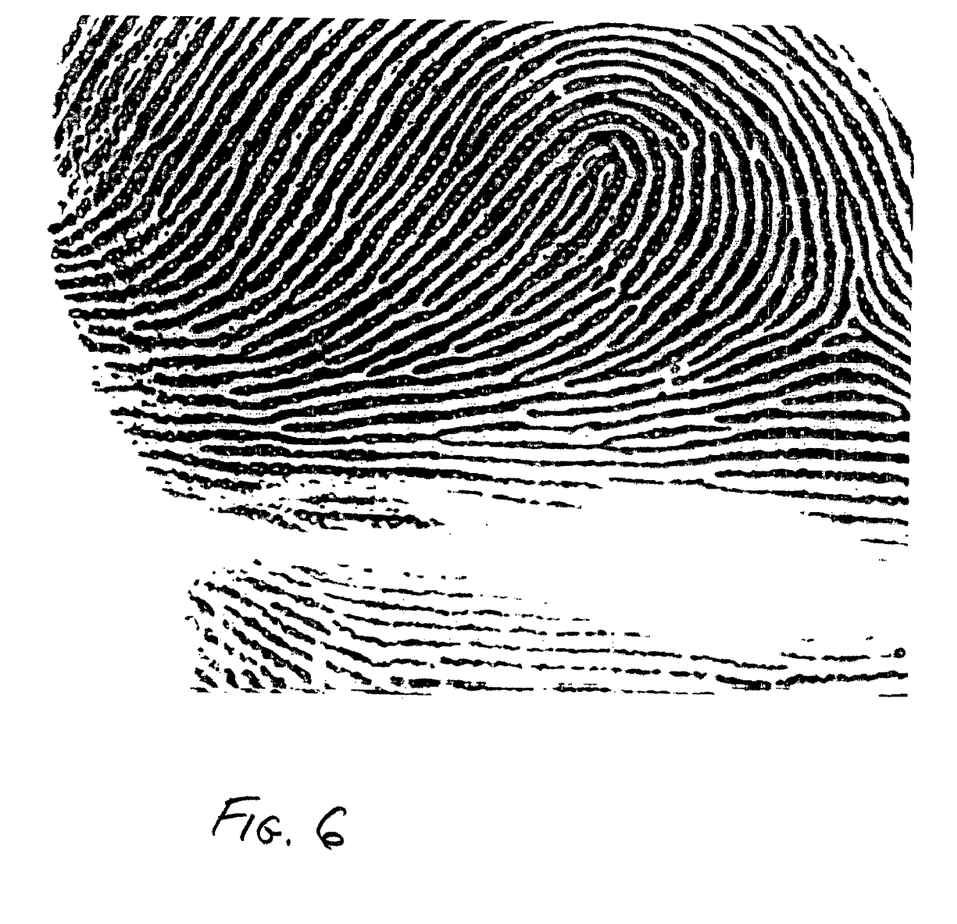
FIG. 6, which depicts an image of a scanned fingerprint showing the captured skin surface detail at 1000 lines per inch resolution. This image shows such skin surface detail as sweat pores and incipient ridge features.

FIG. 6 shows an image of a fingerprint that might be produced by a system 1 according to the invention. The resolution of the image is such that small surface details, such as sweat pores and incipient ridge features, are visible. The invention may be used to create an image of a finger friction ridge surface that is similar to images obtained using conventional ink and paper techniques.

Figure 7:
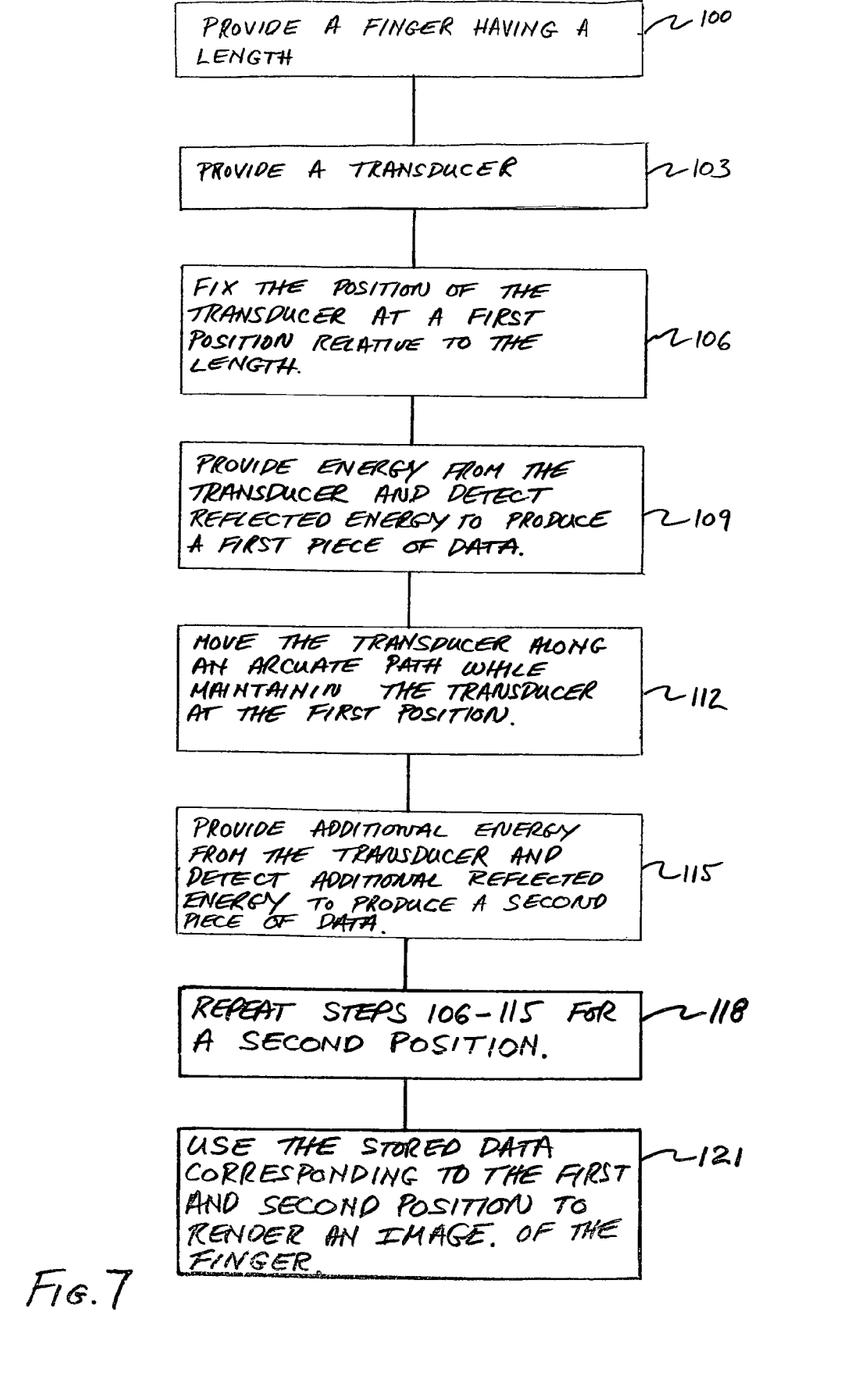
FIG. 7, which depicts steps of one method according to the invention.

The invention may include a method of imaging a finger. FIG. 7 illustrates one such method. In such a method, a finger is provided 100. The finger has a length and a circumference. A platen may be selected to accommodate the circumference of the finger. An ultrasound transducer may be provided 103 and the position of the transducer may be temporarily fixed 106 at a first position relative to the length. Ultrasonic energy may be provided 109 from the transducer. Ultrasonic energy reflected from the finger may be detected and used to produce a first piece of data about the finger at the first position. The first piece of data may be the time that lapsed between sending the ultrasonic energy and receiving the reflected ultrasonic energy. The first piece of data may be stored in a database. Next, the transducer may be moved 112 along an arcuate path while maintaining the transducer at the first position relative to the length. Additional ultrasonic energy may be provided 115 from the transducer and the corresponding reflected ultrasonic energy from the finger may be used to produce a second piece of data about the finger at the first position. The second piece of data may be the time that lapsed between sending the additional ultrasonic energy and receiving the corresponding reflected ultrasonic energy. The second piece of data may be stored in the database.

Once data corresponding to the first position has been produced, similar data corresponding to a second position relative to the length may be produced 118. To do so, the transducer may be linearly moved to the second position and temporarily fixed at the second position. Ultrasonic energy may be provided from the transducer. Ultrasonic energy reflected from the finger may be detected and used to produce a first piece of data about the finger at the second position. The first piece of data may be the time that lapsed between sending the ultrasonic energy and receiving the reflected ultrasonic energy. The first piece of data may be stored in a database. Next, the transducer may be moved along an arcuate path while maintaining the transducer at the second position relative to the length. Additional ultrasonic energy may be provided from the transducer and the corresponding reflected ultrasonic energy from the finger may be used to produce a second piece of data about the finger at the second position. The second piece of data may be the time that lapsed between sending the additional ultrasonic energy and receiving the corresponding reflected ultrasonic energy. The second piece of data may be stored in the database.

The data collected and stored in this fashion may be used 121 to render an image of the finger. The process of using such data to render an image is known in the art, and will not be detailed herein. The precision of the image will be directly proportional to the number of pieces of data stored for each position, and also the number of positions.

Although the present invention has been described with respect to one or more particular embodiments, it will be understood that other embodiments of the present invention may be made without departing from the spirit and scope of the present invention. Hence, the present invention is deemed limited only by the appended claims and the reasonable interpretation thereof.

What is claimed is:

1. A finger imaging system, comprising:
    a linear actuator;
    a pivot arm mounted to the linear actuator;
    an energy transducer mounted to the pivot arm;
    an arcuate platen positioned to receive energy from the transducer.

2. The system of claim 1, further comprising a housing to which the platen is mounted.

3. The system of claim 2, wherein the platen is removable.

4. The system of claim 3, wherein the system includes a plurality of platens, each having a different shape, and each of which may be mounted to the housing.

5. The system of claim 1, wherein the platen is trough shaped.

6. The system of claim 5, wherein the platen is cylindrical.

7. The system of claim 6, wherein the platen is substantially disposed about an axis, and the pivot arm is pivotable about the axis.

8. The system of claim 1, wherein the transducer is mounted to the pivot arm so as to remain perpendicular to the platen as the pivot arm pivots.

9. The system of claim 8, wherein the platen is shaped and mounted to the housing so that the transducer remains at the same distance from the platen while the pivot arm pivots.

10. The system of claim 1, further comprising a position monitoring system, capable of determining the linear and angular position of the transducer.

11. The system of claim 1, further comprising a computer in communication with the transducer, the computer being programmed to store data corresponding to an energy signal reflected from a finger positioned on the platen.

12. The system of claim 1, wherein the energy transducer is an ultrasonic energy transducer.

13. The system of claim 1, wherein the energy transducer is an electromagnetic energy transducer.

14. A method of imaging a finger, comprising:
    providing a finger having a length;
    providing an arcuate platen;
    placing the finger on the platen;
    providing an energy transducer;
    fixing the position of the transducer at a first position relative to the length;
    providing energy from the transducer and detecting energy reflected from the finger to produce a first piece of data about the finger at the first position;
    moving the transducer along an arcuate path while maintaining the transducer at the first position relative to the length;
    providing additional energy from the transducer and detecting additional reflected energy from the finger to produce a second piece of data about the finger at the first position.

15. The method of claim 14, further comprising:
    moving the transducer to a second position relative to the length;
    providing energy from the transducer and detecting energy reflected from the finger to produce a first piece of data about the finger at the second position;
    moving the transducer along an arcuate path while maintaining the transducer at the second position relative to the length;
    providing additional energy from the transducer and detecting additional energy reflected from the finger to produce a second piece of data about the finger at the second position.

16. The method of claim 15, further comprising using the data to create an image of the finger.

* * * * *